US006796121B2

(12) United States Patent
Thoma et al.

(10) Patent No.: US 6,796,121 B2
(45) Date of Patent: Sep. 28, 2004

(54) HYDROSTATIC TRANSAXLE

(75) Inventors: Christian Helmut Thoma, Jersey (GB); George Duncan McRae Arnold, Jersey (GB)

(73) Assignee: Hydro-Thoma Limited (GB)

( * ) Notice: Subject to any disclaimer, the term of this patent is extended or adjusted under 35 U.S.C. 154(b) by 40 days.

(21) Appl. No.: 10/202,066

(22) Filed: Jul. 25, 2002

(65) Prior Publication Data

US 2002/0189251 A1 Dec. 19, 2002

Related U.S. Application Data

(62) Division of application No. 09/814,939, filed on Mar. 23, 2001, now Pat. No. 6,427,442, which is a division of application No. 09/411,835, filed on Oct. 4, 1999, now Pat. No. 6,237,332, which is a division of application No. 09/112,363, filed on Jul. 9, 1998, now Pat. No. 5,979,270.

(60) Provisional application No. 60/051,990, filed on Jul. 9, 1997.

(51) Int. Cl.[7] .............................................. F16H 57/02
(52) U.S. Cl. ............................. 60/456; 60/487; 60/489; 74/606 R
(58) Field of Search ....................... 60/456, 487, 489; 74/606 R

(56) References Cited

U.S. PATENT DOCUMENTS

| | | | |
|---|---|---|---|
| 3,411,296 A | 11/1968 | Peterson | |
| 4,461,341 A | 7/1984 | Morrison | |
| 4,627,237 A | 12/1986 | Hutson | |
| 4,856,264 A | 8/1989 | Nishimura et al. | |
| 4,891,943 A | 1/1990 | Okada | |
| 4,893,524 A * | 1/1990 | Ohashi et al. | 60/487 |
| 4,914,907 A * | 4/1990 | Okada | 60/487 |
| 5,074,195 A * | 12/1991 | Ohashi et al. | 60/458 |
| 5,078,659 A | 1/1992 | von Kaler et al. | |
| 5,090,947 A | 2/1992 | Van Rooij | |
| 5,090,949 A | 2/1992 | Thoma et al. | |
| 5,163,293 A | 11/1992 | Azuma et al. | |
| 5,191,813 A | 3/1993 | Havens | |
| 5,205,124 A | 4/1993 | Budzich | |
| 5,211,077 A * | 5/1993 | Louis et al. | 60/464 |
| 5,230,519 A | 7/1993 | Nishimura et al. | |
| 5,289,738 A | 3/1994 | Sculczewski | |
| 5,339,631 A | 8/1994 | Ohashi | |
| 5,392,603 A | 2/1995 | Havens et al. | |
| 5,392,670 A | 2/1995 | Hauser | |
| 5,394,699 A | 3/1995 | Matsufuji | |
| 5,412,947 A | 5/1995 | Hirose | |
| 5,440,951 A * | 8/1995 | Okada et al. | 60/456 |
| 5,473,964 A | 12/1995 | Okada et al. | |
| 5,501,640 A | 3/1996 | Hauser et al. | |
| 5,622,051 A | 4/1997 | Iida et al. | |
| 5,636,555 A | 6/1997 | Okada et al. | |
| 5,709,084 A | 1/1998 | Krantz | |
| 5,794,443 A | 8/1998 | Shimizu | |
| 5,799,486 A | 9/1998 | Takada et al. | |
| 5,802,851 A | 9/1998 | Krantz | |
| 5,809,845 A | 9/1998 | Shimizu et al. | |
| 5,819,537 A | 10/1998 | Okada et al. | |
| 5,836,159 A | 11/1998 | Shimizu et al. | |

(List continued on next page.)

FOREIGN PATENT DOCUMENTS

WO    WO 96/30227    10/1996

Primary Examiner—Edward K. Look
Assistant Examiner—Igor Kershteyn
(74) Attorney, Agent, or Firm—Young & Thompson

(57) ABSTRACT

A hydrostatic transaxle axle assembly for a vehicle has the housing formed by three housing members, two of which are preferably separable on a parting plane coincident with the longitudinal axes of the axle shafts. One of the housing members is provided with an opening to allow a portion of one of the other housing members to extend through, and the extending housing member contains within its interior a number of internal fluid passages for fluidly connecting the hydraulic pump to the hydraulic motor.

81 Claims, 7 Drawing Sheets

U.S. PATENT DOCUMENTS

| | | |
|---|---|---|
| 5,918,691 A | 7/1999 | Ishii |
| 5,951,425 A | 9/1999 | Iida et al. |
| 6,007,449 A * | 12/1999 | Okada et al. .................. 74/650 |
| 6,073,443 A | 6/2000 | Okada et al. |
| 6,109,032 A | 8/2000 | Shimizu et al. |
| 6,223,531 B1 | 5/2001 | Hauser et al. |
| 6,233,929 B1 | 5/2001 | Okada et al. |
| 6,272,854 B1 | 8/2001 | Ishii et al. |
| 6,390,227 B1 * | 5/2002 | Abend et al. .................. 60/492 |
| 6,449,949 B1 | 9/2002 | Abend et al. |

* cited by examiner

HYDROSTATIC TRANSAXLE

RELATED APPLICATIONS

This application is a division of Application Ser. No. 09/814,939, filed on Mar. 23, 2001, now U.S. Pat. No. 6,427,442, which is a Divisional of U.S. Patent Appln. Ser. No. 09/411,835 filed on Oct. 4, 1999, now U.S. Pat. No. 6,237,332, which is a Divisional of U.S. Patent Appln. Ser. No. 09/112,363 filed on Jul. 9, 1998, now U.S. Pat. No. 5,979,270, which is a Provisional of U.S. Patent Appln. Ser. No. 60/051,990 filed on Jul. 9, 1997, the entire contents of which are hereby incorporated by reference.

FIELD OF THE INVENTION

This invention relates to hydrostatic transaxles, and more particularly, to a compact, fully integrated hydrostatic transaxle incorporating a hydrostatic transmission of the type employing an axial piston swash-plate pump and a hydraulic motor. Hydrostatic-transmissions in association with transaxle driving apparatus have proven to be very useful to-date and are used in numerous applications such as small vehicles like self-propelled grass-mowing lawn tractors.

BACKGROUND OF THE INVENTION

Hydrostatically powered driven equipment such as lawn tractors have become extremely popular and many utilise the axial piston swash-plate configuration for both the pump and motor elements of the hydrostatic transmission. Such tractors generally have an internal combustion engine having a vertical crankshaft which is connected to the transaxle by means of a conventional belt and pulley arrangement. A standard hydrostatic transmission for such a transaxle includes a hydraulic pump, which is driven by an input shaft from the engine output by means of the belt and pulley arrangement, and a hydraulic motor, both pump and motor are mounted on a center section located inside the transaxle housing. Rotation of the pump by an input shaft creates axial motion of the pump pistons during periods when the pistons are operating against an inclined thrust or swash-plate. The fluid flow thus created by the reciprocating axial motion of the pistons is channelled via porting and passages in the center section to the hydraulic motor, with the effect that the incoming fluid causes the pistons of the motor to reciprocate and create a turning moment that causes rotation of the hydraulic motor. The hydraulic motor in turn has an output shaft which drives the vehicle's axles through speed-reducing gears and a mechanical differential. Examples of such hydrostatic transaxles are shown in the following patents: U.S. Pat. Nos. 5,090,949; 5,473,964 and 5,501,640.

All three references use an axial piston swash-plate pump and motor respectively engaged to a center section which is located within a two-shell housing structure. The main purpose of the center section is to provide a fluid link between the pump and the motor and allowing the transmission of hydraulic power. Patents '964 and '640 in the names of Okada and Hauser respectively, teach the use of an input shaft driven pump where the swash-plate lies adjacent to the upper housing. This contrasts with the disclosure in patent '949 which teaches the use of bevel gears for connecting the input-shaft to the pump and wherein this example of prior art, the swash-plate of the pump lies directly across both the upper and lower housings of the transaxle.

The center section shown in all three above references require numerous machining operations to prepare the initial raw casting to be ready for use. For instance: drilling some or all of the internal flow passages and arranging retaining means so that plugs/valves and such like can be subsequently fitted to close off the flow circuit; making good two of the faces which provide the fluid coupling means for the pump and motor, and when required, for the subsequent attachment of the valve-plates; preparation of mounting surfaces for attaching the center section to the housing structure. Furthermore, the upper transaxle housing aluminium diecasting itself requires a number of machining operations before it can be used such as the provision for the shaft bearing and seal as well as hole or holes and seals for the control lever and various associated linkages.

As a general rule, the more machining operations required in the upper transaxle housing casting as well as the more complex operations required in the center section casting, the greater the cost of manufacture of the complete hydrostatic transaxle. Therefore the reduction in the number of such machining operations and by grouping them into one rather than two components would save expense.

Although only shown in the '949 patent, almost all hydrostatic transaxles make use of a cooling fan mounted to the input drive shaft in an attempt to help prevent the internal components and fluid from overheating. However, the prior art teaches a center section which although attached in some manner to the interior of the housing, it is still essentially a separate entity from the transaxle housing. As a result, effective cooling of the fluid passing through the passages in the center section that connect the pump and motor together is hindered as the fluid surrounding the center section acts as a insulator to slow down the rate of heat transfer from the power transmission fluid in said passages to the surrounding housing radiator.

The amount of heat able to be radiated away from the transaxle housing exterior to the surrounding environment is of course greatly enhanced over that region on the boundary of the transaxle housing that lies directly in the path of the air flow from the cooling fan. However, it is apparent that although the fluid inside the housing nearest that region where the fan is operating is being cooled, fluid elsewhere may still remain at very high temperature. Perhaps more importantly, as the fluid circulating between the pump and motor in the fluid passages in the center section becomes extremely hot during operation, especially when the unit is heavily loaded and used in a high ambient temperature environment, the resulting drop of operating efficiency due to decreasing fluid viscosity and a corresponding increase in fluid leakage losses can be a concern with the prior art.

This problem exists because the attendant power losses associated with such close coupled pump and motor combinations produce a lot of unwanted heat due to the rapid fluid compression/decompression cycles and general friction between the sliding surfaces; Such losses causes the fluid circulating between the pump and motor through the center section to become extremely hot, and because the prior art teaches a transaxle housing structure whereby the internal fluid reservoir completely or almost completely surrounds and insulates the center section, these prior solutions are not conducive to the promotion of most effective cooling for the circulating fluid in the centre section flowing in a closed-loop circuit between the pump and motor. This limitation occurs because the bulk of the heat accumulating in the center section can only be transferred by conduction to the surrounding hydraulic fluid and then through the fluid itself to reach the boundary walls of the housing surrounding the fluid chamber from where it can be radiated away to the surroundings. The remove of unwanted heat from the center section consequently takes time.

Therefore in these prior devices where the center section is effectively insulated by the surrounding hydraulic fluid, the delay in the transfer of unwanted heat out of the transaxle may on occasion result in the fluid of the hydrostatic transmission becoming overheated with the risk that the operational life of the fluid is shortened or that the lubricating properties of the fluid deteriorates to the extent that threatens the useful operational life of the hydrostatic transaxle.

SUMMARY OF THE INVENTION

An object of the invention is to eliminate the need to use a conventional centre section in the hydrostatic transaxle product.

A further object of the invention is to provide a hydrostatic transaxle in which most or all the machining can be carried out in one housing member compared to the prior art where such operations need to be carried out in both the housing as well as the center section.

A still further object of the invention is the grouping of the fluid coupling surfaces for the pump and motor as well as the heat dissipating means on the exterior surfaces on a single housing component, including fluid passages arranged in its interior with bearings, seals, control shafts supported in machined pockets.

A further object of the invention is to improve the cooling of the operating fluid circulating between the pump and motor. With this invention, fan cooling of the housing very effective in lowering the temperature of the hydrostatic transmission fluid as it circulates in the closed-loop circuit between the pump and motor as much of the heat is conducted directly into the material of the housing in the area directly under the path of the air from the cooling fan.

What is needed in thee art is a compact hydrostatic transaxle for vertical input shaft installations where the amount of machining needed to be carried out is consigned to one rather than two or three main component members, preferable in a manner that would allow both the upper and the lower transaxle housing elements or shells for the hydrostatic transaxle to be used in an as cast or supplied state. What is further needed in the art is improved cooling for such devices allowing an extension in the operation duty cycle.

In one form thereof, the hydrostatic transaxle of the invention comprises an axle assembly with a housing having an internal chamber for an internally disposed hydrostatic transmission and forming an integral part of said hydrostatic transmission, said hydrostatic transmission comprising a variable-displacement hydraulic pump and a fixed-displacement hydraulic motor; axle shafts rotatably supported in said housing and differential gearing means supported by said housing drivingly connected between said hydraulic motor and said axle shafts; said housing comprising first, second and third housing members and where said first and second housing members are joined together on a first parting plane and where said second and third housing members are joined on a second parting plane and wherein said first housing member includes internal fluid passages arranged to fluidly connect said hydraulic pump to said hydraulic motor.

The above mentioned and other novel features and objects of the invention, and the manner of attaining them, may be performed in various ways and will now be described by way of examples with reference to the accompanying drawings.

DETAILED DESCRIPTION OF THE FIRST EMBODIMENT OF THE INVENTION

Figure 3:
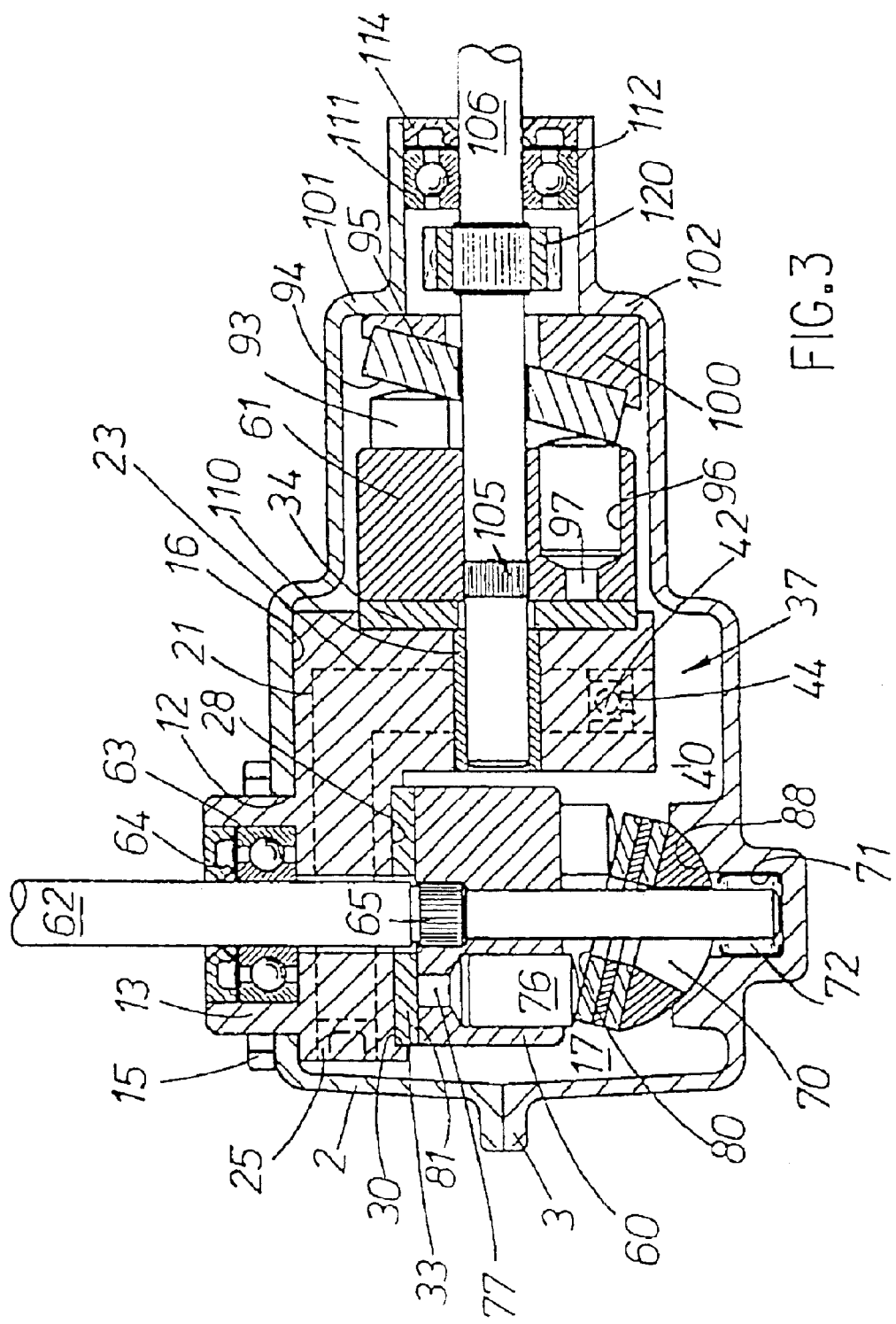
FIG. 3 is a sectioned view on line II—II of FIG. 2 showing the hydrostatic transmission.
Figure 4:
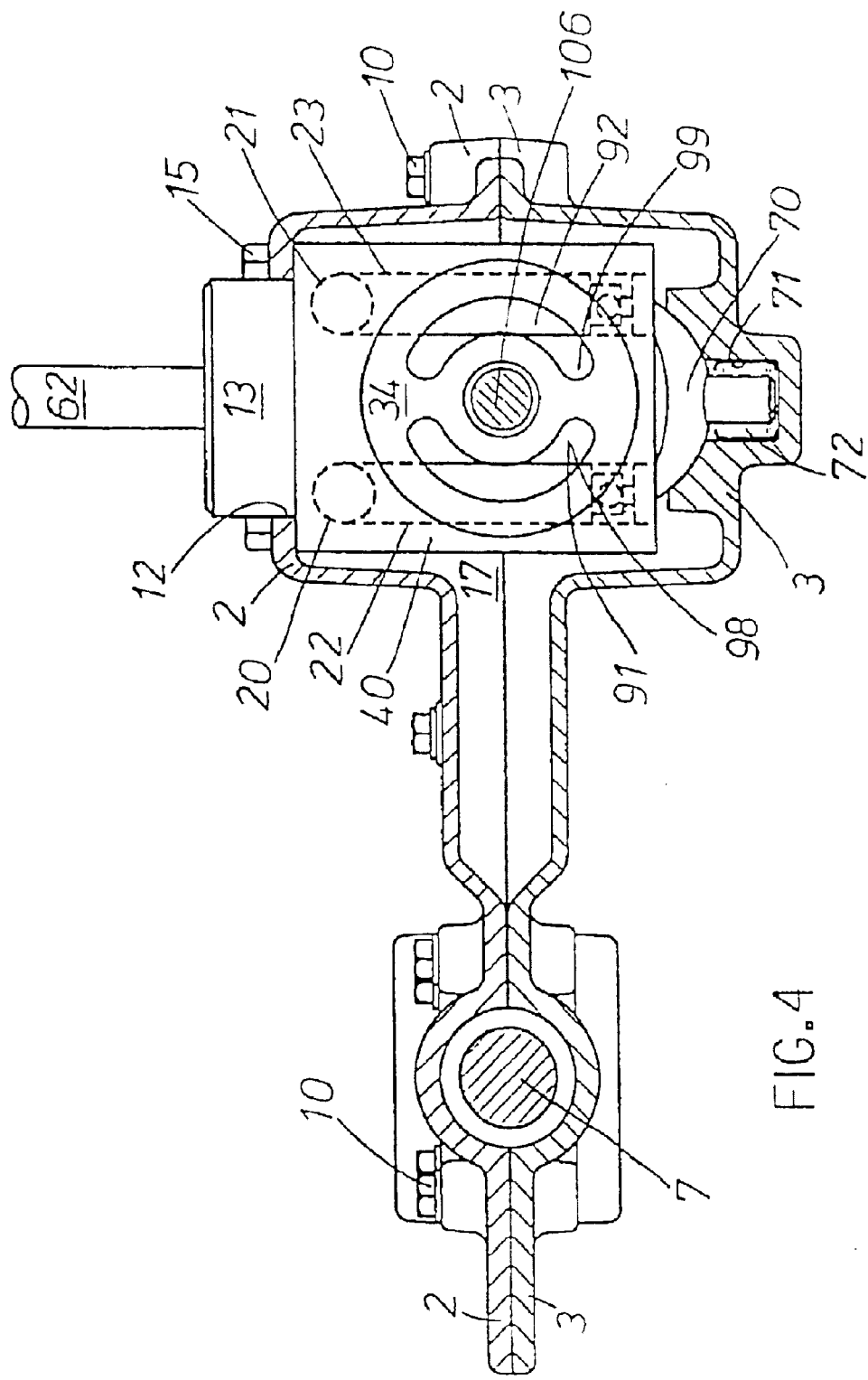
FIG. 4 is a further sectioned view on line III—III of FIG. 2.
Figure 5:
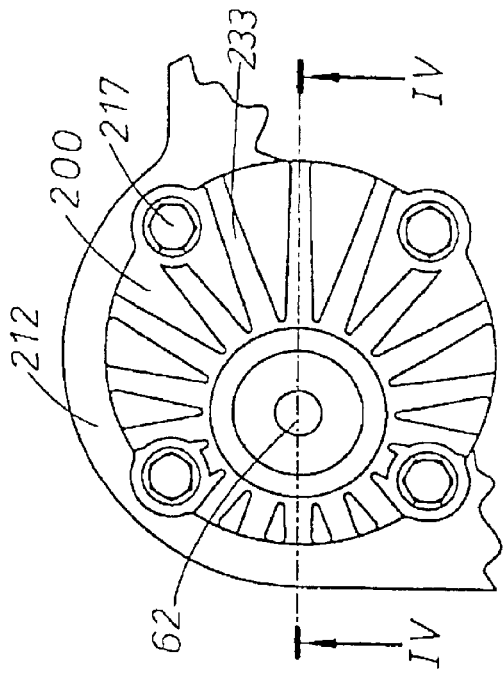
FIG. 5 is a view of an alternative housing construction for the hydrostatic transaxle of FIG. 1.
Figure 6:
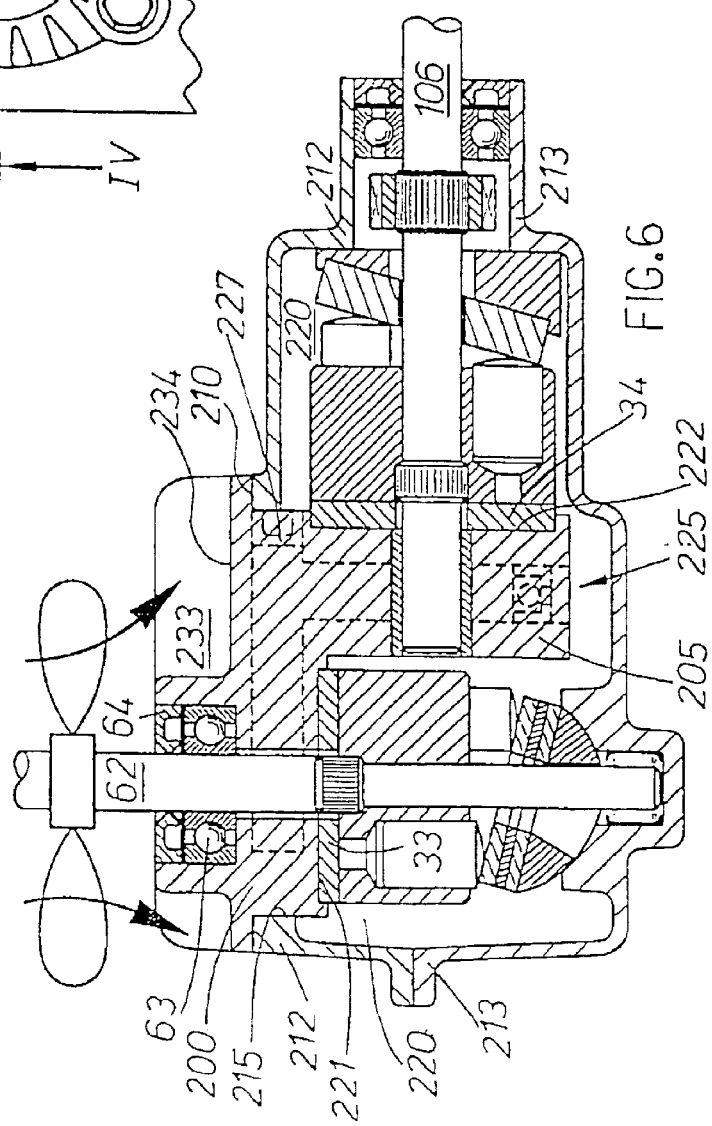
FIG. 6 is a part sectional view along line IV—IV of FIG. 5.

The first embodiment shown in FIGS. 1 to 4, the outer housing structure of the hydrostatic transaxle depicted by arrow 1 is partially defined by an upper transaxle housing element 2 and a lower transaxle housing element 3 which are joined together at a junction surface arranged preferably such that the parting-plane 5 is coincident with the output axle shafts 7, 8. Parting-plane can be called the second parting-plane in this invention. A liquid gasket seal is applied to the junction surface at the parting plane 5 prior to the two transaxle housings element 2, 3 being secured together by a plurality of bolts or screws 10. As shown in FIGS. 3 & 4, upper transaxle housing element 2 is arranged to have opening 12 through which housing member 13 passes and which is then secured in-place by a plurality of fastening screws 15. A seal ring or liquid gasket seal is applied to the junction surface 16 between housings members 2, 13 next to opening 12. Junction surface 16 can be called the first parting-plane in this invention. All three housing members 2, 3, 13 when attached together form the surrounding boundary for an internal chamber 17. Within internal chamber 17, internal elements of the hydrostatic transaxle are located therein such as the hydraulic pump, hydraulic motor, speed reducing gears and mechanical differential. Although internal chamber 17 may be divided into separate chambers for purposes of segregating the hydrostatic transmission from the mechanical gearing (and when required a mechanical differential), the embodiment here illustrates the use of a common chamber 17 for all such components.

Housing member 13 may preferably be cast as one-piece in either aluminium allow or iron/steel. If the piece is cast as a pressure diecasting, many features can be detailed with sufficient accuracy such that many secondary machining operations can be thus avoided.

As a portion of housing member 13 containing within it the fluid passages connecting the pump and motor is exposed to the outer environment, porosity in the casting could led to fluid leakage. However, the possibility of such fluid seepage through the material of the housing member in the present invention can be easily overcome in at least one way, for instance, through the impregnating of that portion of the housing member that would protrude through the opening in the upper housing member of the transaxle with a resin that prevents leakage occurring.

Housing member 13 contains within its structure fluid passages 20, 21, 22, 23 that connect together the respective fluid coupling surfaces otherwise known as valve-faces, between the pump and motor. Fluid passages 20, 21, 22, 23 may be cored in the housing casting 13 or machined. Plugs 25 are used to blank off the ends of passages 20, 21. Although in practice it has been known to cast valve faces in aluminium alloy to provide a running surface for a cylinder-barrel, most common practise these days is to mount separate valve-plates on which respective cylinder-barrels can run against. Most often, such separate valve-plates are surface hardened so that the sealing surfaces may operate for many thousands of hours without suffering from undue wear that would result in a loss in volumetric efficiency of the hydrostatic unit. In this respect, the faces shown as 28, 29 on the housing member 13 may be cast with countersunk register shown as 30, 31 respectively, into which respective valve plates 33, 34 are located. However, the invention would permit the valve faces to be detailed and formed directly on the surface of the subsidiary housing 13 if desired.

Check-valves are included in both respective pairs of passages 20, 22 and 21, 23 to allow the admittance of make-up fluid in order that the hydrostatic transmissions can recover any fluid loss during operation because of leakage. In the present invention, the check-valves shown as 37 have been placed near the lowest position in the downwardly extending portion shown as 40 of the housing member 13 such that balls 42 of the check-valves 37 can fall onto their respective seats 44 by the influence of gravity when not activated by suction pressure. Although not shown, the linkage connecting the swash-plate of the pump to the externally protruding control-lever of the hydrostatic transaxle may be arranged so that when the pump is at or near neutral, the linkage can act in a manner to off seat the balls, thereby proving the hydrostatic transmission with a more positive neutral point.

The respective cylinder-barrels 60, 61 of the hydrostatic-transmission pump and motor are mounted perpendicular to one another such that the rotating axis of the pump cylinder-barrel 60 is vertical and arranged parallel and coaxial with respect to the input-drive shaft 62 whereas the rotating axis of the motor cylinder-barrel 61 is parallel with respect to the rotating axis of the axle-shafts 7, 8. The input drive shaft 62 is supported by a bearing 63 in the housing element 13 and a seal 64 is used to prevent fluid in the internal chamber 17 from escaping. Shaft 62 extends downwards and is provided with a spline 65 which connects with the pump cylinder-barrel 60. Shaft 62 extends further and passes through the center of the swash-plate 70 to be further supported by means of a bearing 72 in lower housing member 3.

Bearing 72 is supported in blind hole 71 which ideally may be sized by the die-caster thereby eliminating any need to machine lower housing member by the transaxle builder although in practice. Alternatively, hole 71 could be cast as a through hole and in this case, an extra seal would then be needed. Bearing 72 may be of the self-aligning type in which case a plain journal bearing may be added to the design positioned, this bearing being positioned just adjacent to valve-plate 33 to act between bearings 63, 72 for providing additional support for drive-shaft 62.

To overcome any misalignment between the bearing 63 in housing member 13 and bearing 72 in the lower housing member 3, it is proposed that during assembly of the hydrostatic transaxle, housing member 13 is only loosely attached by screws 15 until all the components have been assembled in place. Then once input shaft 62 is located into bearing 72, this essentially controls the true position of the housing 13 relative to housing members 2, 3 as the bearing 63 supported input shaft 62 is thereby in correct alignment with bearings 72. At that time, screws 15 can be tightened so that housing elements 2, 13 are thereby locked together.

The cylinder-barrel 60 of the pump is provided with a plurality of axial cylinder-bores 75, each bore 75 containing a respective piston 76 and where each piston 76 is being axially urged outwards by a spring (not shown) located behind the piston 76 in the bore 75. The outer end of the piston 76 is generally domed-shaped to be operatively connected to an adjacent operating surface 80 of swash-plate 70 by the bias produced by springs. The action of the springs behind each of the pistons 76 produces a counter reaction which loads the cylinder-barrel 60 against the operating surface 81 of the adjacent valve-plate 33. Each cylinder-bore 75 has a port 77 so arranged to communicate in sequence with a pair of arcuate-shaped ports (although not visible they are identical to those arcuate-shaped ports 98, 99 shown for the motor) provided on the valve-plate 33, and where such arcuate-shaped ports are in fluid connection with fluid passages 20, 21 in housing member 13.

Figure 1:
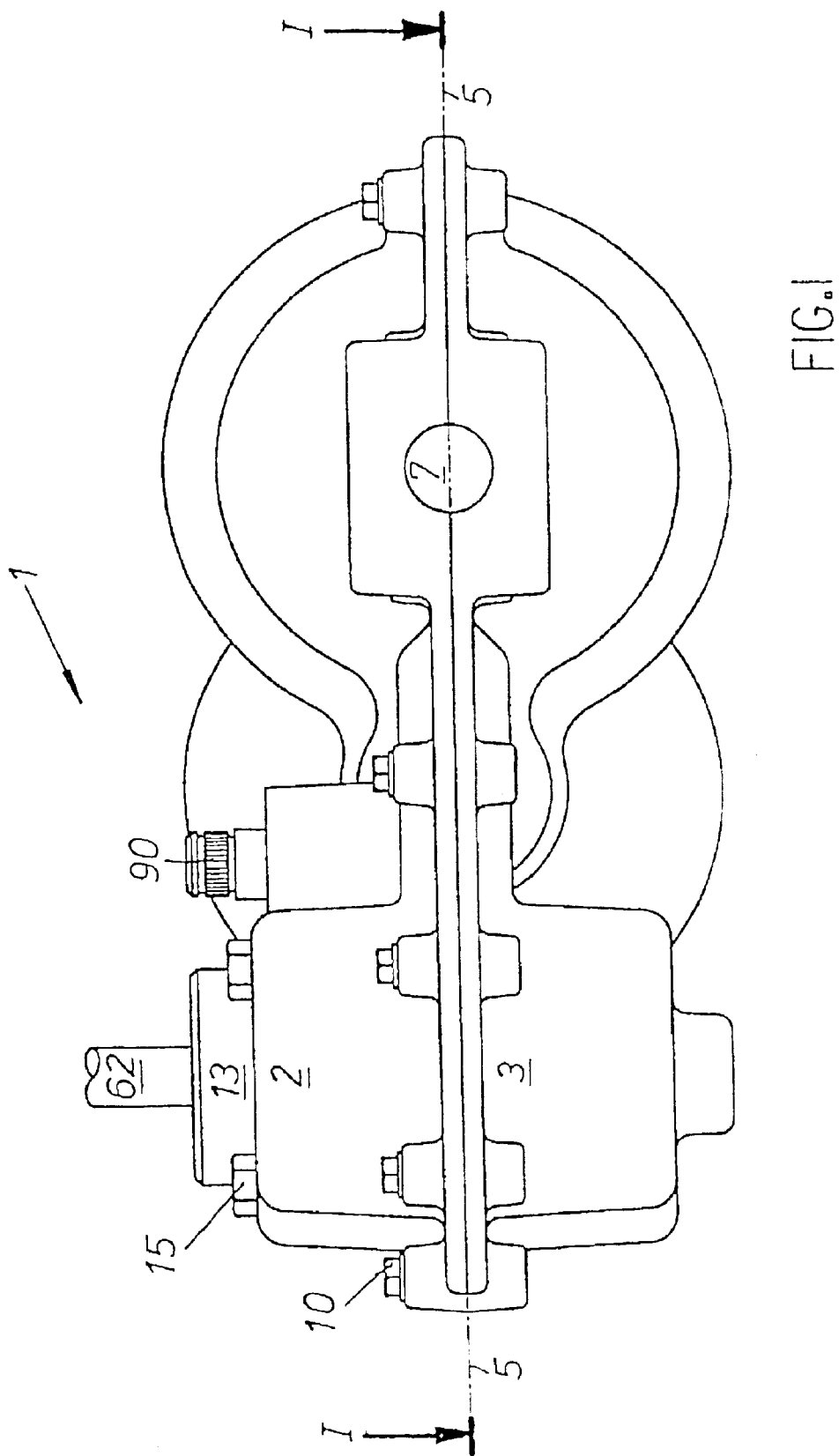
FIG. 1 is an external view from one side of the hydrostatic transaxle according to the invention.
Figure 2:
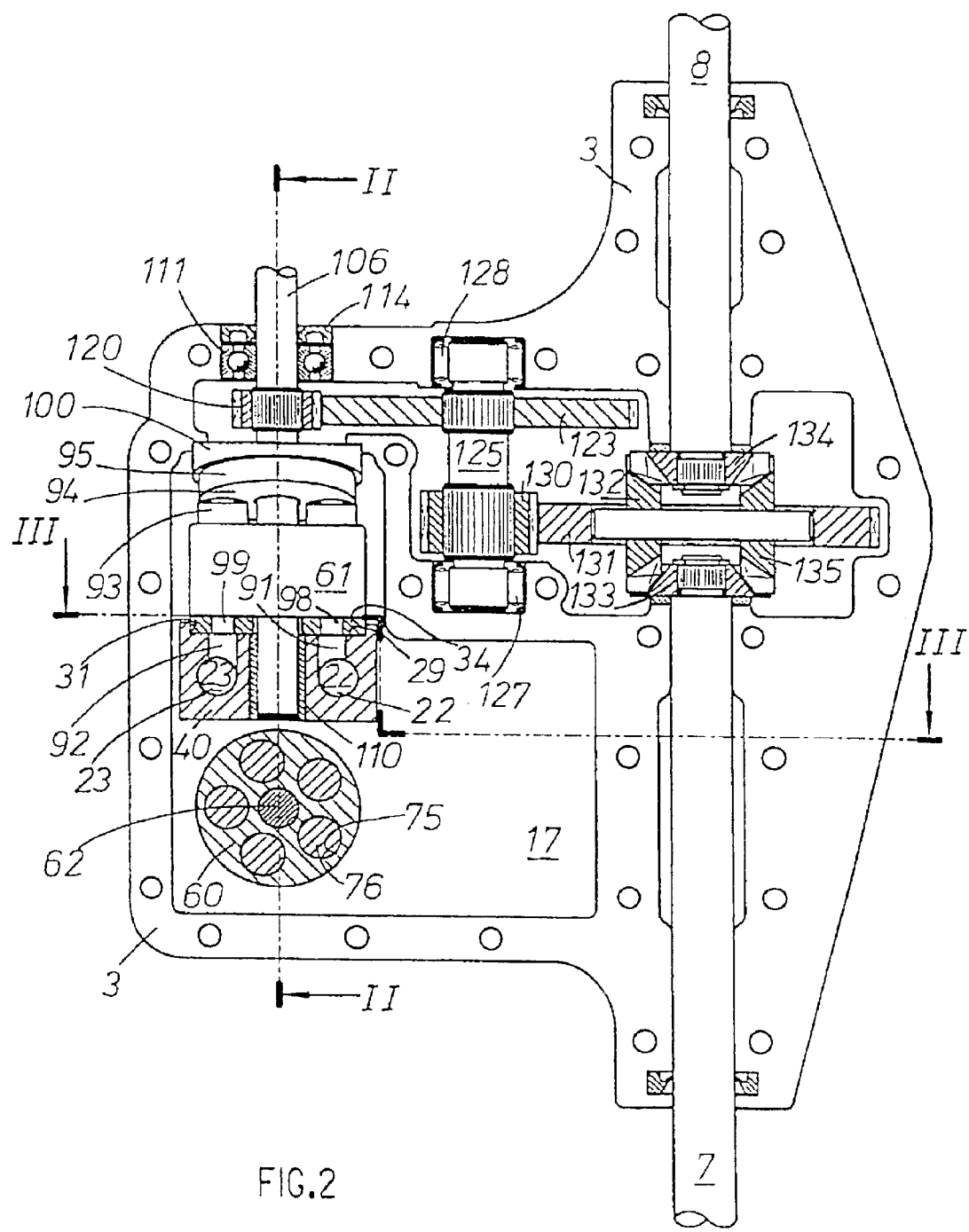
FIG. 2 is a plan view of the hydrostatic transaxle of FIG. 1 along the section line I—I.

Swash-plate 70 is so arranged for the pump that its inclination angle can be varied in both directions from its neutral or zero-inclination point. The swash-plate 70 is seated on a part-cylindrical bearing 88 provided in the interior of the lower housing member 3, and connected by linkages (not shown) to a control-shaft 90 which protrudes from housing member 2 as shown in FIG. 1. Rotary movement of the control-shaft 90 causes the swash-plate 70 to incline in angle in respect of the stroking axis of the pistons 76, and thereby the stroke of the pistons 76 is changed. The amount of piston 76 stroke determines the amount of fluid is placed in the cylinder-bore 75 per each single rotation of the cylinder-barrel 60, and hence the swept volume of the pump can be changed by altering the amount of piston stroke so that the amount of fluid delivered to the hydraulic motor is precisely controlled.

The cylinder-barrel 61 of the motor is almost in all respects identical to that of the pump, and carries a series of pistons 93 which are operatively connected to the operational surface 94 of thrust plate 95. Each piston 93 is housed in its respective cylinder-bore 96 provided within cylinder-barrel 61, and arranged so that each cylinder-bore 96 can communicate in sequence with respective arcuate-shaped ports shown as 98, 99 provided in the valve-plate 34 by means of its respective port 97. Fluid passages 23, 23 in the housing member 13 are arranged to be in fluid connection with respective arcuate shaped ports 98, 99 in the valve-plate 34 of the motor by means of respective linking ducts 91, 92. Although not shown, a spring is positioned within each of the cylinder-bores 96 to engage with its respective piston.

In the case of the motor, the thrust-plate 95 is depicted in its most often used position which is permanently inclined with respect of the axis of pistons 93. The thrust-plate 95 is supported on a insert 100 that is held to the housing member 2, 3 either by fastening mens such as screws or preferably by being pinched tight between adjacent walls as shown 101, 102 in housing member 2, 3. Because the inclination angle of the thrust-plate 95 always remains at an angle during the operation of the device, the piston 93 stroke in the motor remain constant. As the fluid received from the pistons 76 of the pump can be changed by the action of using control-shaft 90, the rotation of the motor can be in either direction. The cylinder-barrel 61 is mechanically engaged by spline 105 to shaft 106 and thus rotation of the cylinder-barrel 61 causes rotation of shaft 106. As fluid enters the motor from the arcuate shaped ports 98, 99 in the valve-plate 34, the fluid entering the cylinders of the pistons 93 causes the pistons 93 to move axially outwards and because the reaction on the thrust-plate 95 to the piston movement is not co-axial with the longitudinal axis of the pistons 93, an angular driving moment is created on the cylinder-barrel 61 which is caused to revolve. Therefore rotation of the cylinder-barrel 61 and shaft 106 is transmitted through the speed reducing gears to the differential and axle output shafts 7, 8 of the hydrostatic transaxle 1 which in the case of a vehicle application such as lawn tractor, are attached the drive wheels of the vehicle.

Shaft 106 is supported by bearings 110, 111, bearing 110 being located in the downwards extending portion 40 of subsidiary housing member 13, whereas bearing 111 is located in a pocket 112 arranged between housing member 2, 3. The shaft 106 may protrude from the transaxle so that a conventional disc parking brake can be attached. A seal 114 is also provided to surround the shaft 106 in order to prevents fluid seeping out of the internal chamber 17.

A gear 120 fixed to shaft 106 is in mesh with gear 123 which is fixed to intermediary-shaft 125. Intermediary shaft 125 is supported by bearings 127, 128 in similar manner to that described for the shaft 106. Gear 130 fixed to intermediary-shaft 125 is in mesh with the ring-gear 131 of the differential-assembly.

The ring-gear 131 of the differential-assembly has bevel gears shown as 132, 133, 134, 135 so that power can be transmitted from the differential-assembly to the axle-shafts 7, 8 of the transaxle 1 as known to those skilled in the art. The inclusion of a differential assembly is important as it allows normal differentiation between the left and right drive wheels of the vehicle and helps prevent lawn damage especially when tight turns are undertaken However, there are applications where no such differentialled action is required, and in these instances, a single axle shaft may be used instead of the two as shown in this embodiment. In the case of a single axle shaft, this shaft can be arranged to extend outwardly on one or both sides form the housing.

By means of appropriate selection or adjustment of the inclination of the swash-plate 70 of the pump by means of the control-shaft 90 and the intermediary linkage, the hydrostatic transmission ratio is altered. Rotation of the input-shaft 62 causes cylinder-barrel 60 to rotate and results in reciprocation of pistons 76. Fluid is then delivered from passages 20, 22 or 21, 23 (depending on which direction of low occurs from the pump) in the housing member 13 and enters the cylinder-barrel 61 of the motor and causes the pistons 93 to reciprocate in their respective bores by way of their angle of attack against the inclined thrust-plate 95. A side force is created by the pistons 93 on the wall of each bore in those bores subjected to pressurised fluid, causing rotation of the motor cylinder-barrel 61 about its longitudinal or central axis for rotation. The cylinder-barrel 61 in turn rotates shaft 106 and mechanical power is transmitted through gears 10, 123, 130 to the ring gear 131 of the differential. Bevel gearing of the differential then determines the respective speeds of the axle output shafts 7, 8 that drive the wheels of the vehicle.

DETAILED DESCRIPTION OF THE SECOND EMBODIMENT OF THE INVENTION

As the second embodiment differs in only one main respect from the first embodiment, description is only necessary to show the main points of differences. As the internal components are identical to those described for the first embodiment, for convenience, most that are here numbered will carry the same reference numeral as for the first embodiment.

Essentially as shown in FIGS. 5 to 9, the housing member 200 containing within the pairs of fluid passages 201, 203 and 202, 204 that are used in linking the pump to the motor, is attached to an exterior junction surface (first parting-plane) shown as 210 provided on the upper surface of housing member 212. Housing element 212 is provided with an opening 215 which acts as the register for housing member 200 and where fastening screws 217 are used to secure housing members 200, 212 together. Housing member 212 combine with the lower transaxle housing member 213 to form an internal chamber 220.

Figure 9:
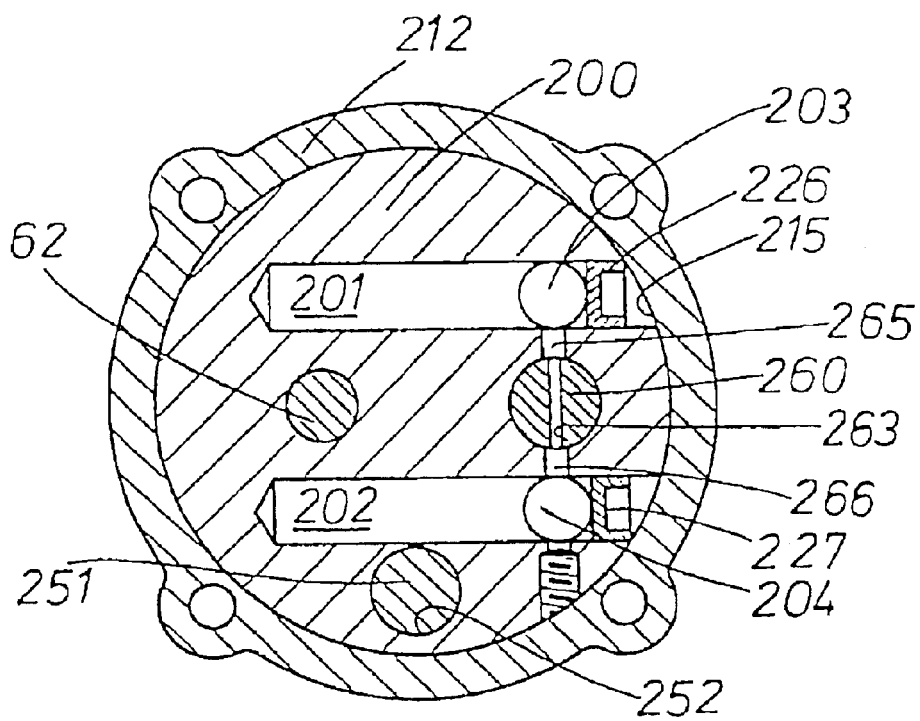
FIG. 9 is a sectioned view taken at line VI—VI of FIG. 8.
Figure 10:
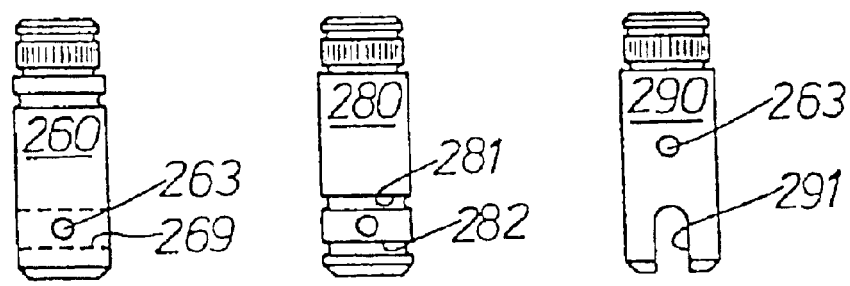
FIG. 10 depict various forms of fluid valves for use in the alternative housing construction.

Housing member 200 is provided with a face surface 221 for the valve-plate of the pump, and on the downwards extending portion 205 is provided with face surface 222 for the valve-plate 34 of the motor. Check-valves show as 225 are included for each passages 203, 204 respectively, and plugs 226, 227 as shown in FIG. 9, are used to close the ends of passages 201, 202. Plugs 226, 227 do not need to be threaded in passages 201, 202 as they are prevented from being expelled because of adjacent wall formed by the opening 215 in housing member 212.

This embodiment also contrasts with the first embodiment in that substantially more cooling fins shown as 233 can be included on the top surface 234 of housing member 200, thereby providing more efficient and effective cooling of the fluid passing through passage 201, 202, 203, 204 between the pump and motor.

Although the present invention will still allow some of the heat to be transferred out from the transaxle by conduction through the hydraulic fluid medium to the outer housing in a similar manner as used in the prior art devices, the total cooling effect is enhanced because the most important area to be cooled, namely the fluid path between pump and motor, is directly adjacent that portion in the housing on which the cooling fan is most effective. Consequently, the hydrostatic transaxle can be operated for longer periods at rated loads with less risk of overheating the power transmission fluid.

A control-shaft 251 is journalled at 252 in the housing member 200. Having the control shaft located in the housing member containing the internal fluid passages can also be performed in the first embodiment of the invention if so desired.

Figure 7:
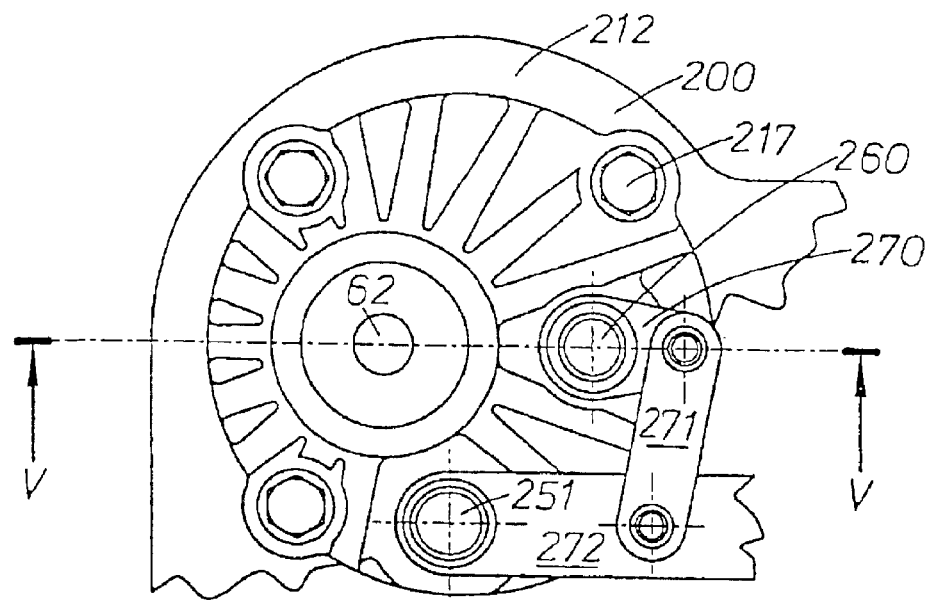
FIG. 7 depicts external control linkages for use with the alternative housing construction of FIG. 5.
Figure 8:
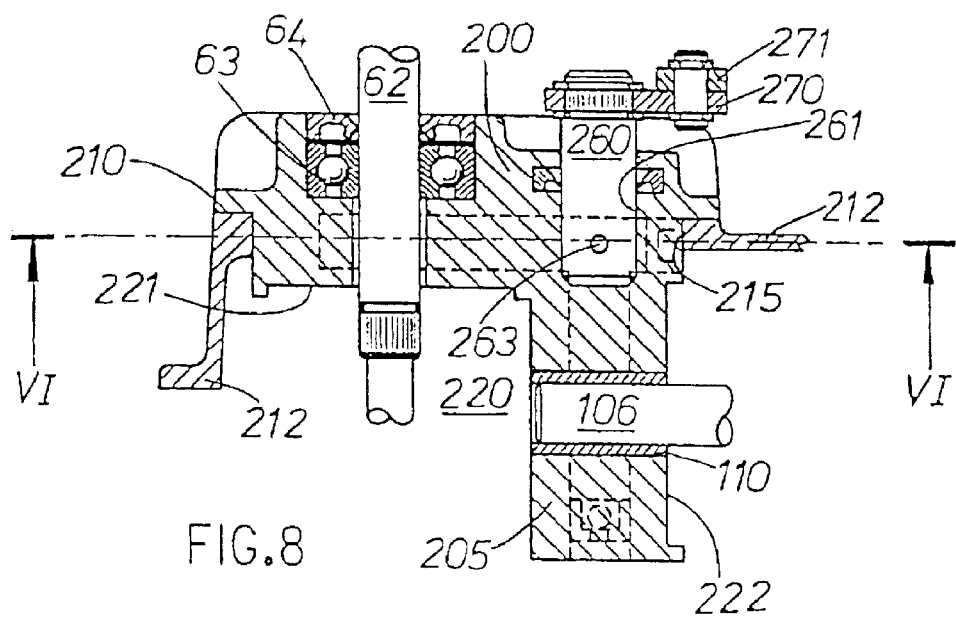
FIG. 8 is a part sectional view along line V—V of FIG. 7.

Rotary vent valve 260 shown in FIGS. 7 to 10 may be used to provided a "wider band neutral" effect for the hydrostatic transmission, and as well as if desired, a "freewheel" or fluid dumping effect. Essentially, the valve 260 is supported in bore 261 in housing member 200 and is provided with a fluid short-circuit shown as small passage 263 which, when the swash-plate of the pump is near its zero inclination angle, passage can connect with two passages shown as 265, 266 in housing member 200 which are in communication with fluid passages 201, 203 and 202, 204 respectively. As shown, any fluid released by the pump when the swash-plate has a small inclination angle can divert through passage 263 rather than flow to the hydraulic motor where it would act in causing the motor assembly to rotate. FIG. 7 shows how valve 260 can be linked to control-shaft 251 by means of linkages 270, 271, 272 so that the movement in position of passage 263 occurs as control-shaft 251 is moved by the operator of the vehicle. By varying in the span or arm length of the linkages, it is possible to obtain varying characteristics from the "wider band neutral" to suit each particular application. Valve 260 is shown as the left-hand illustration in FIG. 10 and shows hidden passage 269 which is perpendicular to passage 263. Disconnection of linkage 270 with valve 260 would allow the valve 260 to be rotated through ninety degrees to provide a large flow short-circuit between passages 265, 266 as hidden passage 269 becomes a short-circuit for the fluid. Valve 280 shows a modification whereby grooves 281, 282 are provided for "O" ring type seals that surround passage 263. Valve 290 illustrates a further modification where the valve can be axially lifted so that passage 263 is no-longer in connection with passages 265, 266 in housing member 200, so that in the lifted position, slot 291 is open to passages 265, 266 to short-circuit fluid into internal chamber 220. Thus the degree of flow restriction caused by fluid having to pass through the restricted passage 263 is overrided, and the vehicle can be easy pushed without having to first start the engine. A further advantage of having the vent valve in the housing element is that adjustments to the operating condition of the hydrostatic transaxle can be made without disassembly of the entire unit.

Although not shown or described in either of the embodiments of the invention, a further modification falling within the scope of the present invention would be to re-arrange lower housing member shown as 3 in the area about the swash-plate 70 and bearing 72 so that a fourth housing member could be used. The fourth housing member would be provided with a hole for bearing 72 and a part-cylindrical support-surface for the swash-plate 70. The fourth housing member could be attached and secured to the inside interior wall of housing element 3 or alternatively, be attached to the outside of housing element 3 on a mounting face and arranged that part of it extends through an opening provided the housing member 3. In this manner, the housing member containing the fluid passages can further be attached to the fourth housing element by means of stays or studs which are arranged to pass through the top exterior to the bottom exterior which would stiffen the complete housing structure of the hydrostatic transaxle.

Perhaps for certain applications, there may be advantage in substituting the fixed-displacement axial piston swash-plate hydraulic motor with that of another type. For instance, a fixed-displacement external geared hydraulic motor could be used instead and where the gears of the motor in this instance would be journalled in bores provided in the same housing member containing the fluid passages linking the pump to the motor.

A charge and/or power take-off auxiliary pump, preferably of the gerotor internal gear type may also be disposed in the same housing member that contains the fluid passages linking the pump to the motor of the hydrostatic transmission. The gerotor pump being driven by the input drive shaft and having fluid passages and valves arranged in the same housing member to suit the needs of the application. A further advantages in this arrangement would allow the pressure setting of the gerotor pump to be adjusted easily as the pressure relief-valve would have an external adjustment; the fan cooling effect of the present invention would help keep the fluid delivered by the gerotor pump to be kept as cool as possible; all the external connections can be arranged to be near the top of the transaxle thereby minimising the changes of being damaged.

In accordance with the patent statutes, we have described the principles of construction and operation of our invention, and while we have endeavoured to set forth the best embodiments thereof, we desire to have it understood that obvious changes may be made within the scope of the following claims without departing from the spirit of our invention.

We claim:
1. An integrated hydrostatic transaxle comprising
a housing;
a hydrostatic transmission disposed in said housing, said hydrostatic transmission comprising an axial piston pump having a rotary pump cylinder barrel, and an axial piston motor having a rotary motor cylinder barrel;
an input drive shaft having a vertical axis of rotation rotatably supported in said housing and having a first portion protruding outside of said housing and a second portion protruding inside of said housing to engage said rotary pump cylinder barrel via a spline connection for rotation at equal speed therewith;
a motor shaft rotatably supported in said housing and disposed perpendicular to said input drive shaft, said motor shaft engaging said rotary motor cylinder barrel via a spline connection for rotation at equal speed therewith;
a gear train disposed in said housing;
a mechanical differential disposed in said housing;
a pair of axle shafts rotatably supported in said housing and extending outwardly from said housing, said mechanical differential drivingly connected between said motor shaft and said axle shafts by said gear train, said gear train comprising first and second gears respectively engaging an output gear mounted on said motor shaft and a ring gear disposed on said mechanical differential;
an internal bulkhead wall formed in said housing and formed substantially vertically to be disposed generally parallel to the vertical axis of said pump cylinder barrel, said internal bulkhead wall delimiting an inner fluid reservoir surrounding said hydrostatic transmission from an inner fluid reservoir surrounding said mechanical differential and said gear train such that said hydrostatic transmission is disposed one side of said internal bulkhead wall whereas said mechanical differential and said gear train is disposed on the opposite side;
an intermediary-shaft disposed in said housing between said output shaft and said pair of outwardly extending axle shafts and carrying said first and second gears between respective axial ends of said intermediary-shaft, said intermediary-shaft receiving support nearer one of said respective axial ends in said bulkhead and extending from said bulkhead to span said inner fluid reservoir surrounding said mechanical differential and said gear train to receive further support by said housing nearer the other of said respective axial ends; and
a fluid coupling surface disposed in a first horizontal plane inside said housing and engaging said pump cylinder barrel, said fluid coupling surface being spaced from underlying surfaces of said housing, said motor shaft having a horizontal axis of rotation disposed in a second horizontal plane, said first horizontal plane residing parallel to and not coincident with said second horizontal plane and wherein said first horizontal plane is situated nearer said first portion of said input drive shaft than said second horizontal plane.
2. The integrated hydrostatic transaxle according to claim 1 wherein said housing includes a lower transaxle housing element and an upper transaxle housing element joined together along a horizontal parting plane, said upper transaxle housing element including transverse channels opening on said parting plane to receive said axle shafts.

3. The integrated hydrostatic transaxle according to claim 2 wherein the longitudinal axis of rotation of said axle shafts is disposed parallel to said parting plane, and the longitudinal axis of said intermediary-shaft lies along said second horizontal plane.

4. The integrated hydrostatic transaxle according to claim 3, wherein said axial piston motor is of a fixed displacement type and further comprises a thrust bearing constituting a fixed angle swash plate held by an annular support disposed adjacent said internal bulkhead wall, said horizontal axis of said motor shaft disposed parallel to said horizontal axis of said intermediate-shaft and said motor shaft arranged to pass through said internal bulkhead wall to connect said rotary motor cylinder barrel with said output gear.

5. The integrated hydrostatic transaxle according to claim 4 wherein said transverse channels communicate with said inner fluid reservoir surrounding said mechanical differential.

6. The integrated hydrostatic transaxle according to claim 5 wherein said housing includes a first side surface and a second side surface, one of said pair of said axle shafts projecting outwardly from said first side surface and the other of said pair of axle shafts projecting outwardly from said second side surface, wherein a width of said housing between said first and second side surfaces is greater than a length of said housing.

7. The integrated hydrostatic transaxle according to claim 6, and further comprising a further fluid coupling surface disposed inside said housing.

8. The integrated hydrostatic transaxle according to claim 7, wherein said second horizontal plane is arranged to be coincident with said parting plane, and further comprising a pair of fluid passages inside said housing and hydraulically connecting said fluid coupling surface and said further fluid coupling surface together; a respective check valve fluidly connecting with a respective one of said pair of fluid passages and where at least one said check valve is to reside to that side of said fluid coupling surface furtherest away from said first portion of said input drive shaft, said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages.

9. The integrated hydrostatic transaxle according to claim 8 wherein said parting plane is uniplanar.

10. The integrated hydrostatic transaxle according to claim 9, further comprising transverse channels in said lower housing element and opening on said parting plane for receiving said axle shafts, and wherein said longitudinal axis of said axle shafts is coincident with said parting plane.

11. The integrated hydrostatic transaxle according to claim 7, and further comprising an interior junction surface formed in said housing, said one-piece casting secured to said interior junction surface and said one-piece casting formed with a pair of internal fluid passages for interconnecting said pump to said motor, a respective check valve fluidly connecting with a respective one of said pair of fluid passages and where at least one said check valve is to reside to that side of said fluid coupling surface furtherest away from said first portion of said input drive shaft;

said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages; and further comprising an internal fluid releasing device to allow a release of high-pressure fluid from whichever of said internal fluid passages contains fluid under a higher pressure once the inclination angle of said swash plate is decreased to a position set in accordance with a wider band neutral condition.

12. The integrated hydrostatic transaxle according to claim 11, wherein said interior junction surface lies along a horizontal plane disposed parallel to the longitudinal axis of said axle shafts and perpendicular to said bulkhead wall at an elevation above said transverse channels.

13. The integrated hydrostatic transaxle according to claim 12, wherein said motor shaft is disposed parallel to said intermediary-shaft.

14. The integrated hydrostatic transaxle according to claim 13, wherein the longitudinal axis of said intermediary-shaft lies coincident with said parting plane and below said interior junction surface.

15. The integrated hydrostatic transaxle according to claim 14, wherein said interior junction surface is offset from said parting plane to be nearer to said first portion than said second horizontal plane.

16. The integrated hydrostatic transaxle according to claim 15, wherein said lower transaxle housing element includes complementary transverse channels opening on said parting plane to receive said axle shafts, and wherein the longitudinal axis of said axle shafts lie coincident with said parting plane.

17. The integrated hydrostatic transaxle according to claim 6, and further comprising a one-piece casting at least partially disposed in said housing and surrounded from below by said housing, said fluid coupling surface mounted or formed on said one-piece casting.

18. The integrated hydrostatic transaxle according to claim 17, wherein said one-piece casting is a further housing element.

19. The integrated hydrostatic transaxle according to claim 17, and further comprising a further fluid coupling surface disposed inside said housing, said further fluid coupling surface mounted or formed on said one-piece casting and disposed perpendicular to said fluid coupling surface.

20. The integrated hydrostatic transaxle according to claim 19, and further comprising a pair of fluid passages hydraulically interconnecting said pump with said motor, said pair of internal fluid passages disposed in said one-piece casting at an elevation below that elevation of said first portion of said input drive shaft; and further comprising a first pair of arcuate-shaped ports positioned on said fluid coupling surface and a matching second pair of arcuate-shaped ports on said other fluid coupling surface, respective pairs of arcuate-shaped ports hydraulically interconnected by said internal fluid passages; and further comprising a pair of fluid passages inside said housing and hydraulically connecting said fluid coupling surface and said further fluid coupling surface together;

and further comprising a pair of check valve assemblies supported by said one-piece casting and where each check valve assembly is in fluid communication with a respective internal fluid passage, said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages.

21. The integrated hydrostatic transaxle according to claim 20, wherein said axle shafts are of differing lengths, and said coupling surface and said other coupling surface lying to that side of said mechanical differential assembly where the longer one of the two said axle shafts is drivingly connected to.

22. The integrated hydrostatic transaxle according to claim 2, and further comprising a further fluid coupling surface disposed inside said housing, wherein said axle shafts are of differing lengths, and said coupling surface and said other coupling surface lying to that side of said mechanical differential assembly where the longer one of the two said axle shafts is drivingly connected to.

23. The integrated hydrostatic transaxle according to claim 22, and further comprising an interior junction surface formed in said housing, said one-piece casting secured to said interior junction surface and said one-piece casting formed with a pair of internal fluid passages for interconnecting said pump to said motor, a respective check valve fluidly connecting with a respective one of said pair of fluid passages and where at least one said check valve is to reside to that side of said fluid coupling surface furtherest away from said first portion of said input drive shaft, said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages.

24. The integrated hydrostatic transaxle according to claim 23, wherein said interior junction surface lies along a horizontal plane disposed parallel to the longitudinal axis of said axle shafts and perpendicular to said bulkhead wall at an elevation above said transverse channels.

25. The integrated hydrostatic transaxle according to claim 24, wherein said motor further comprises a thrust plate mounted on an insert, said insert disposed adjacent said one side of said bulkhead wall and wherein said motor output shaft passes through said bulkhead for the transmission of power between said hydrostatic transmission and said reduction gear train.

26. The integrated hydrostatic transaxle according to claim 25, wherein said pump further comprises a swash plate, said swash plate inclinable relative to the longitudinal axis of said input drive shaft; and further comprising a manually operated control shaft rotatably supported in said housing for altering the inclination angle of said swash plate, said control shaft having an external portion protruding outside said housing, wherein rotational movement of said control shaft produces a change in said inclination angle of said swash plate, and wherein the elevation of at least said external portion is entirely above the elevation of said first horizontal plane.

27. The integrated hydrostatic transaxle according to claim 26, further comprising an internal fluid releasing device to allow a release of high-pressure fluid from whichever of said internal fluid passages contains fluid under a higher pressure once the inclination angle of said swash plate is decreased to a position set in accordance with a wider band neutral condition.

28. The integrated hydrostatic transaxle according to claim 27, wherein said internal fluid releasing device operates through a greater arc of rotational motion than said control shaft.

29. The integrated hydrostatic transaxle according to claim 26, wherein said external portion is disposed along a vertical axis lying parallel to and offset from said vertical axis of rotation of said input drive shaft.

30. The integrated hydrostatic transaxle according to claim 26, wherein the respective elevations of said pump cylinder barrel and said swash plate is such said pump cylinder barrel lies above said swash plate.

31. The integrated hydrostatic transaxle according to claim 2, wherein the longitudinal axis of rotation of said axle shafts is coincident with said parting plane.

32. The integrated hydrostatic transaxle according to claim 1 wherein said internal bulkhead wall fluidly segregates said inner fluid reservoir surrounding said hydrostatic transmission from said inner fluid reservoir surrounding said mechanical differential and said gear train.

33. The integrated hydrostatic transaxle according to claim 1, wherein said internal bulkhead wall permits fluid to flow between said inner fluid reservoir surrounding said hydrostatic transmission and said inner fluid reservoir surrounding said mechanical differential and said gear train.

34. The integrated hydrostatic transaxle according to claim 1, wherein said housing includes a lower transaxle housing element and an upper transaxle housing element joined along a horizontal parting plane, said lower housing element including transverse channels opening on said parting plane to receive said axle shafts.

35. The integrated hydrostatic transaxle according to claim 34, wherein said longitudinal axis of said axle shafts is disposed parallel to said parting plane, and the longitudinal axis of said intermediary-shaft lies along said second horizontal plane.

36. An integrated hydrostatic transaxle comprising:

a housing formed with an interior space divided into a hydrostatic transmission chamber and a separate mechanical gearing chamber by an internally disposed bulkhead wall;

a hydrostatic transmission residing in said hydrostatic transmission chamber and disposed to one side of said bulkhead wall, and wherein said hydrostatic transmission comprising an axial piston pump having a rotary pump cylinder barrel, and an axial piston motor having a rotary motor cylinder barrel, said pump having a vertical axis of rotation and said motor disposed perpendicular to said pump and having a horizontal axis of rotation;

a pump fluid coupling surface disposed in a first horizontal plane inside said housing and engaging said pump cylinder barrel, said pump fluid coupling surface being spaced from underlying surfaces of said housing;

a gear train residing in said mechanical gearing chamber;

a mechanical differential assembly residing in said mechanical gearing chamber, said mechanical differential assembly and said gear train disposed on the opposite side of said bulkhead wall, and said gear train drivingly connecting said mechanical differential assembly;

axle shafts rotatably supported in said housing and extending outwardly from said housing, said axle shaft drivingly connected to said mechanical differential assembly, and said gear train comprising an output gear, first and second gears, and a ring gear formed as part of said mechanical differential assembly;

an input drive shaft having a vertical axis of rotation rotatably supported in said housing and having a first portion protruding outside of said housing and a second portion protruding into said hydrostatic transmission chamber to co-axially engage said rotary pump cylinder barrel via a spline connection for rotation at equal speed therewith;

a motor shaft rotatably supported in said housing and engaging said rotary motor cylinder barrel via spline connection for rotation at equal speed therewith, said motor shaft having a horizontal axis of rotation disposed in a second horizontal plane and said output gear mounted on said motor shaft;

an intermediary-shaft disposed in said housing between said output shaft and said pair of outwardly extending axle shafts and carrying said first and second gears between respective axial ends of said intermediary-shaft, said intermediary-shaft receiving support nearer one of said respective axial ends in said bulkhead and extending from said bulkhead to span said mechanical gearing chamber to receive further support by said housing nearer the other of said respective axial ends;

said first horizontal plane residing parallel to and not coincident with said second horizontal plane and wherein said first horizontal plane is situated nearer said first portion of said input drive shaft than said second horizontal plane.

37. The integrated hydrostatic transaxle according to claim 36, and further comprising a one-piece casting at least partially disposed in said housing and surrounded from below by said housing, a motor fluid coupling surface disposed in a vertical plane in said housing and formed or mounted on said one-piece casting.

38. The integrated hydrostatic transaxle according to claim 37, wherein said housing including a lower transaxle housing element and an upper transaxle housing element joined together along a horizontal parting plane, said upper transaxle housing element including transverse channels opening on said parting plane to receive said axle shafts, and wherein the longitudinal axis of said axle shafts is disposed parallel with said parting plane.

39. The integrated hydrostatic transaxle according to claim 38, and further comprising an interior junction surface formed in said housing, said one-piece casting secured to said interior junction surface, and wherein said interior junction surface lies along a horizontal plane disposed parallel to the longitudinal axis of said axle shafts and perpendicular to said bulkhead wall at an elevation above said transverse channels.

40. The integrated hydrostatic transaxle according to claim 39, wherein said longitudinal axis of said axle shafts is coincident with said parting plane.

41. The integrated hydrostatic transaxle according to claim 40, wherein said one-piece casting includes an integral spigot portion and where said spigot portion resides exteriorly of said housing.

42. The integrated hydrostatic transaxle according to claim 41, wherein said one-piece casting is a further housing element.

43. The integrated hydrostatic transaxle according to claim 37, wherein said pump fluid coupling surface is formed or mounted on said one-piece casting, and wherein said pump fluid coupling surface is perpendicular to said motor fluid coupling surface.

44. The integrated hydrostatic transaxle according to claim 43, wherein said internally disposed bulkhead wall is formed substantially vertically to be disposed generally parallel to the vertical axis of rotation of said pump cylinder barrel; said housing including a lower transaxle housing element and an upper transaxle housing element joined together along a horizontal parting plane and where said first horizontal plane lies above said parting plane, and further comprises a first outer wall of said housing adjacent said hydrostatic transmission chamber and opposite to said one side of said bulkhead wall and a second outer wall of said housing adjacent said mechanical gearing chamber and opposite to said opposite side of said bulkhead wall; said housing further comprises a first wing integral with said housing and extending outwardly beyond said first side wall and a second wing integral with said housing and extending outwardly beyond said second side wall, said upper transaxle housing element including transverse channels opening on said parting plane to receive said axle shafts, said channels extending outwardly from said mechanical gearing chamber and encompassing the first and second wings, wherein a width of said housing between said first and second wings is greater than a length of said housing.

45. The integrated hydrostatic transaxle according to claim 44, wherein said motor further comprises a thrust plate mounted on an insert, said insert disposed adjacent said one side of said bulkhead wall and wherein said motor output shaft passes through said bulkhead for the transmission of power between said hydrostatic transmission and said reduction gear train.

46. The integrated hydrostatic transaxle according to claim 45, wherein said motor comprises a motor cylinder barrel containing a plurality of motor cylinders and where a motor piston is disposed in each of said motor cylinders; and further comprising a pair of internal fluid passages hydraulically interconnecting said pump with said motor, said pair of internal fluid passages disposed in said one-piece casting at an elevation below that elevation of said first portion of said input drive shaft.

47. The integrated hydrostatic transaxle according to claim 46, and further comprising a first pair of arcuate-shaped ports positioned on said pump fluid coupling surface and a matching second pair of arcuate-shaped ports on said motor fluid coupling surface, respective pairs of arcuate-shaped ports hydraulically interconnected by said internal fluid passages; and further comprising a pair of check valve assemblies supported by said one-piece casting and where each check valve assembly is in fluid communication with a respective internal fluid passage, said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages.

48. The integrated hydrostatic transaxle according to claim 47, wherein said pump further comprises a swash plate, said swash plate inclinable relative to the longitudinal axis of said input drive shaft; and further comprising a manually operated control shaft rotatably supported in said housing for altering the inclination angle of said swash plate, said control shaft having an external portion protruding outside said housing, wherein rotational movement of said control shaft produces a change in said inclination angle of said swash plate, and wherein the elevation of at least said external portion is entirely above the elevation of said first horizontal plane.

49. The integrated hydrostatic transaxle according to claim 48, wherein said external portion is disposed along a vertical axis lying parallel to and offset from said vertical axis of rotation of said input drive shaft.

50. The integrated hydrostatic transaxle according to claim 48, wherein the respective elevations of said pump cylinder barrel and said swash plate is such said pump cylinder barrel lies above said swash plate.

51. The integrated hydrostatic transaxle according to claim 48, further comprising an internal fluid releasing device to allow a release of high-pressure fluid from whichever of said internal fluid passages contains fluid under a higher pressure once the inclination angle of said swash plate is decreased to a position set in accordance with a wider band neutral condition.

52. The integrated hydrostatic transaxle according to claim 51, wherein said internal fluid releasing device operates through a greater arc of rotational motion than said control shaft.

53. The integrated hydrostatic transaxle according to claim 52, and further comprising an intermediary-shaft, one end of said intermediary-shaft extending into said opposite side of said bulkhead wall and supported by said bulkhead wall and where said intermediary-shaft carries at least two gears of said reduction gear train.

54. The integrated hydrostatic transaxle according to claim 53, and further comprising an interior junction surface formed in said housing, said one-piece casting secured to said interior junction surface and said one-piece casting formed with a pair of internal fluid passages for interconnecting said pump to said motor, a respective check valve fluidly connecting with a respective one of said pair of fluid passages and where at least one said check valve is to reside to that side of said pump fluid coupling surface furtherest away from said first portion of said input drive shaft, said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages, wherein the longitudinal axis of said intermediary-shaft lies coincident with said parting plane and below said interior junction surface, wherein the longitudinal axis of said intermediary-shaft lies coincident with said parting plane and below said interior junction surface.

55. The integrated hydrostatic transaxle according to claim 54, wherein said interior junction surface lies along a horizontal plane disposed parallel to the longitudinal axis of said axle shafts and perpendicular to said bulkhead wall at an elevation above said transverse channels.

56. The integrated hydrostatic transaxle according to claim 43, wherein said internally disposed bulkhead wall is formed substantially vertically to be disposed generally parallel to the vertical axis of rotation of said pump cylinder barrel; said housing further comprising a first outer wall of said housing adjacent said hydrostatic transmission chamber and opposite to said one side of said bulkhead wall and a second outer wall of said housing adjacent said mechanical gearing chamber and opposite to said opposite side of said bulkhead wall; and further comprising a first wing integral with said housing and extending outwardly beyond said first side wall and a second wing integral with said housing and extending outwardly beyond said second side wall; wherein a width of said housing between said first and second wings is greater than a length of said housing.

57. The integrated hydrostatic transaxle according to claim 56, and further comprising an intermediary-shaft, one end of said intermediary-shaft extending into said opposite side of said bulkhead wall and supported by said bulkhead wall and the opposing end of said intermediary-shaft extends into a pocket in said second outer wall of said housing to receive further support, and where said intermediary-shaft carries at least two gears of said reduction gear train.

58. The integrated hydrostatic transaxle according to claim 57, wherein said housing including a lower transaxle housing element and an upper transaxle housing element joined together along a horizontal parting plane, said upper transaxle housing element including transverse channels opening on said parting plane to receive said axle shafts, said channels extending outwardly from said mechanical gearing chamber and encompassing the first and second wings.

59. The integrated hydrostatic transaxle according to claim 58, wherein said housing including a lower transaxle housing element and an upper transaxle housing element joined together along a horizontal parting plane, said lower transaxle housing element including transverse channels opening on said parting plane to receive said axle shafts, said channels extending outwardly from said mechanical gearing chamber and encompassing the first and second wings.

60. The integrated hydrostatic transaxle according to claim 58, wherein said housing including a lower transaxle housing element and an upper transaxle housing element joined together along a horizontal parting plane, the upper and lower transaxle housing elements including respective transverse channels opening on said parting plane to receive said axle shafts, said channels extending outwardly from said mechanical gearing chamber and encompassing the first and second wings.

61. The integrated hydrostatic transaxle according to claim 58, wherein said motor further comprises a thrust plate mounted on an insert, said insert disposed adjacent said one side of said bulkhead wall and wherein said motor output shaft passes through said bulkhead for the transmission of power between said hydrostatic transmission and said reduction gear train.

62. The integrated hydrostatic transaxle according to claim 61, and further comprising an interior junction surface formed in said housing, said one-piece casting secured to said interior junction surface and said one-piece casting formed with a pair of internal fluid passages for interconnecting said pump to said motor, a respective check valve fluidly connecting with a respective one of said pair of fluid passages and where at least one said check valve is to reside to that side of said pump fluid coupling surface furtherest away from said first portion of said input drive shaft, said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages, wherein the longitudinal axis of said intermediary-shaft lies coincident with said parting plane and below said interior junction surface, wherein the longitudinal axis of said intermediary-shaft lies coincident with said parting plane and below said interior junction surface.

63. The integrated hydrostatic transaxle according to claim 62, wherein said interior junction surface lies along a horizontal plane disposed parallel to the longitudinal axis of said axle shafts and perpendicular to said bulkhead wall at an elevation above said transverse channels.

64. The integrated hydrostatic transaxle according to claim 36, wherein said motor further comprises a thrust plate mounted on an insert, said insert disposed adjacent said one side of said bulkhead wall and wherein said motor output shaft passes through said bulkhead for the transmission of power between said hydrostatic transmission and said reduction gear train.

65. The integrated hydrostatic transaxle according to claim 36, wherein said internally disposed bulkhead wall is formed substantially vertically to be disposed generally parallel to the vertical axis of rotation of said pump cylinder barrel.

66. The integrated hydrostatic transaxle according to claim 36, wherein said hydrostatic transmission chamber is fluidly segregated from said mechanical gearing chamber.

67. The integrated hydrostatic transaxle according to claim 36, wherein said input drive shaft passes through the center of said pump fluid coupling surface.

68. The integrated hydrostatic transaxle according to claim 36, wherein said motor output shaft passes through the center of said motor coupling surface.

69. The integrated hydrostatic transaxle according to claim 36, wherein the respective axes of rotation of said input drive shaft and said output drive shaft intersect each other at an elevation lying below said first horizontal plane.

70. An integrated hydrostatic transaxle comprising:
a housing formed with an interior space divided into a hydrostatic transmission chamber and a separate mechanical gearing chamber by an internally disposed bulkhead wall;
a hydrostatic transmission residing in said hydrostatic transmission chamber and comprising a pump and a motor, said pump being of the axial piston variable-displacement type employing a rotary pump cylinder barrel;
a pump fluid coupling surface disposed in a first horizontal plane inside said housing and engaging said pump cylinder barrel, said pump fluid coupling surface being spaced from underlying surfaces of said housing;
a gear train residing in said mechanical gearing chamber;
a mechanical differential assembly residing in said mechanical gearing chamber, and said gear train drivingly connecting said mechanical differential assembly;
axle shafts rotatably supported in said housing and extending outwardly from said housing, said axle shaft drivingly connected to said mechanical differential assembly, and said gear train comprising an output gear, first and second gears, and a ring gear formed as part of said mechanical differential assembly;
an input drive shaft having a vertical axis of rotation rotatably supported in said housing and having a first portion protruding outside of said housing and a second portion protruding into said hydrostatic transmission chamber to co-axially engage said rotary pump cylinder barrel via a spline connection for rotation at equal speed therewith;
a motor shaft rotatably supported in said housing and engaging said motor for rotation at equal speed, said motor shaft having a horizontal axis of rotation disposed in a second horizontal plane and said output gear mounted on said motor shaft;
an intermediary-shaft disposed in said housing between said output shaft and said pair of outwardly extending axle shafts and carrying said first and second gears between respective axial ends of said intermediary-shaft, said intermediary-shaft receiving a support nearer one of said respective axial ends in said bulkhead and extending from said bulkhead to span said mechanical gearing chamber to receive further support by said housing nearer the other of said respective axial ends;
said first horizontal plane residing parallel to and not coincident with said second horizontal plane and wherein said first horizontal plane is situated nearer said first portion of said input drive shaft than said second horizontal plane.

71. The integrated hydrostatic transaxle according to claim 70, and further comprising a one-piece casting at least partially disposed in said housing and surrounded from below by said housing and a motor fluid coupling surface disposed in a vertical plane is said housing and formed or mounted on said one-piece casting, said motor fluid coupling surface disposed perpendicular to said pump fluid coupling surface.

72. The integrated hydrostatic transaxle according to claim 71, and further comprising an interior junction surface formed in said housing, said one-piece casting secured to said interior junction surface and said one-piece casting further comprising a pair of internal fluid passages, a first pair of arcuate-shaped ports positioned on said pump fluid coupling surface and a matching second pair of arcuate-shaped ports on said said motor fluid coupling surface, respective pairs of arcuate-shaped ports hydraulically interconnected by said internal fluid passages, a respective check valve fluidly connecting with a respective one of said pair of fluid passages and where at least one said check valve is to reside to that side of said pump fluid coupling surface furtherest away from said first portion of said input drive shaft,
said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages, wherein said pair of internal fluid passages reside at an elevation below the elevation of said interior junction surface and where the longitudinal axis of said intermediary-shaft lies below said interior junction surface.

73. The integrated hydrostatic transaxle according to claim 71, and further comprising an interior junction surface formed in said housing, said one-piece casting secured to said interior junction surface and said one-piece casting further comprising a pair of internal fluid passages, a first pair of arcuate-shaped ports positioned on said pump fluid coupling surface and a matching second pair of arcuate-shaped ports on said said motor fluid coupling surface, respective pairs of arcuate-shaped ports hydraulically interconnected by said internal fluid passages, a respective check valve fluidly connecting with a respective one of said pair of fluid passages and where at least one said check valve is to reside to that side of said pump fluid coupling surface furtherest away from said first portion of said input drive shaft,
said check valve assemblies residing below said first horizontal plane and positioned to be in spaced separation from underlying interior surfaces of said housing and where said check valve assemblies include an unpressurized entry passage which can open in response to a pressure differential for delivery of make-up fluid to enter one of said internal fluid passages, wherein the longitudinal axis of said intermediary-shaft lies coincident with said parting plane and below said interior junction surface.

74. The integrated hydrostatic transaxle according to claim 73, wherein said internally disposed bulkhead wall is formed substantially vertically to be disposed generally parallel to said vertical axis of rotation of said input drive shaft and said interior junction surface is offset from said parting plane to be nearer to said first portion than said second horizontal plane.

75. The integrated hydrostatic transaxle according to claim 71, wherein said one-piece casting includes an integral spigot portion and where said spigot portion resides exteriorly of said housing.

76. The integrated hydrostatic transaxle according to claim 71, wherein said one-piece casting includes an integral spigot portion and where said spigot portion resides exteriorly of said housing.

77. The integrated hydrostatic transaxle according to claim 71, wherein said one-piece casting is a further housing element.

78. The integrated hydrostatic transaxle according to claim 70, wherein said motor is a fixed-displacement motor.

79. The integrated hydrostatic transaxle according to claim 78, wherein said fixed-displacement motor is of the axial piston motor employing a rotary motor cylinder barrel, said motor further comprises a thrust plate mounted on an insert, said insert disposed adjacent said bulkhead wall and wherein said motor output shaft passes through said bulkhead for the transmission of power between said hydrostatic transmission and said gear train.

80. The integrated hydrostatic transaxle according to claim 70, wherein said housing comprises a lower transaxle housing element and an upper transaxle housing element joined together along a horizontal parting plane, a first side surface and a second side surface, said upper transaxle housing element including transverse channels opening on said parting plane to receive said axle shafts, one of said pair of said axle shafts projecting outwardly from said first side surface and the other of said pair of axle shafts projecting outwardly from said second side surface, wherein a width of said housing between said first and second side surfaces is greater than a length of said housing, and wherein the longitudinal axis of said axle shafts is disposed parallel with said parting plane.

81. The integrated hydrostatic transaxle according to claim 80, wherein said longitudinal axis of said axle shafts is coincident with said parting plane.

* * * * *